United States Patent [19]

Fagerlund

[11] 4,402,485
[45] Sep. 6, 1983

[54] ECCENTRICALLY NESTED TUBE GAS LINE SILENCER

[75] Inventor: Allen C. Fagerlund, Marshalltown, Iowa

[73] Assignee: Fisher Controls Company, Inc., Marshalltown, Iowa

[21] Appl. No.: 272,742

[22] Filed: Jun. 11, 1981

[51] Int. Cl.³ .................... F16K 47/08; F15D 1/04
[52] U.S. Cl. ............................ 251/118; 251/127; 181/268; 181/254; 138/41; 138/44
[58] Field of Search .................. 138/40, 41, 44; 251/127, 118; 181/267, 268, 275, 254, 238, 258

[56] References Cited

U.S. PATENT DOCUMENTS

| | | | |
|---|---|---|---|
| 1,432,797 | 10/1922 | Skeels | 181/267 |
| 1,709,426 | 4/1929 | Beery | 251/127 X |
| 2,708,006 | 5/1955 | Backman | 181/267 X |
| 3,170,483 | 2/1965 | Milroy . | |
| 3,630,229 | 12/1971 | Nagel et al. | 251/118 X |
| 3,665,965 | 5/1972 | Baumann . | |
| 4,000,878 | 1/1977 | Vick . | |
| 4,008,737 | 2/1977 | Kluczunski . | |
| 4,050,479 | 9/1977 | Baumann . | |
| 4,058,141 | 11/1977 | Hasinger . | |
| 4,085,774 | 4/1978 | Baumann . | |
| 4,150,811 | 4/1979 | Condit | 251/315 |
| 4,180,100 | 12/1979 | Kolb . | |

FOREIGN PATENT DOCUMENTS 17680 of 1906 United Kingdom ............... 181/267

Primary Examiner—Arnold Rosenthal
Attorney, Agent, or Firm—Allegretti, Newitt, Witcoff & McAndrews, Ltd.

[57] ABSTRACT

A device for attenuating noise of fluid in non-axisymmetric turbulent flow which comprises a conduit and a plurality of parallel aligned nested tubes in said conduit. The nested tubes are of varying cross-sectional size and have approximately the same cross-sectional shape. The tubes are eccentrically aligned with respect to each other such that a lower surface of each tube is in closely spaced relationship or is in substantially line contact with a surface of an adjacent tube along their longitudinal lengths, the line contact between all of the tubes being substantially at a common line, allowing for the thickness of the tube walls. A brace extends through and interconnects the nested tubes. In one embodiment, the noise attenuating device is spaced closely downstream from a reverse flow ball valve to provide a smooth transition from the non-axisymmetric flow discharging from the valve to substantially axisymmetric flow (or fully developed pipe flow) in the conduit downstream of the valve. The front of the tubes may be configured to lie in a plan generally transverse to the conduit. In another embodiment, the front of the tubes are configured to lie in a generated surface that is complementary to the exterior of the reverse flow ball valve.

25 Claims, 10 Drawing Figures

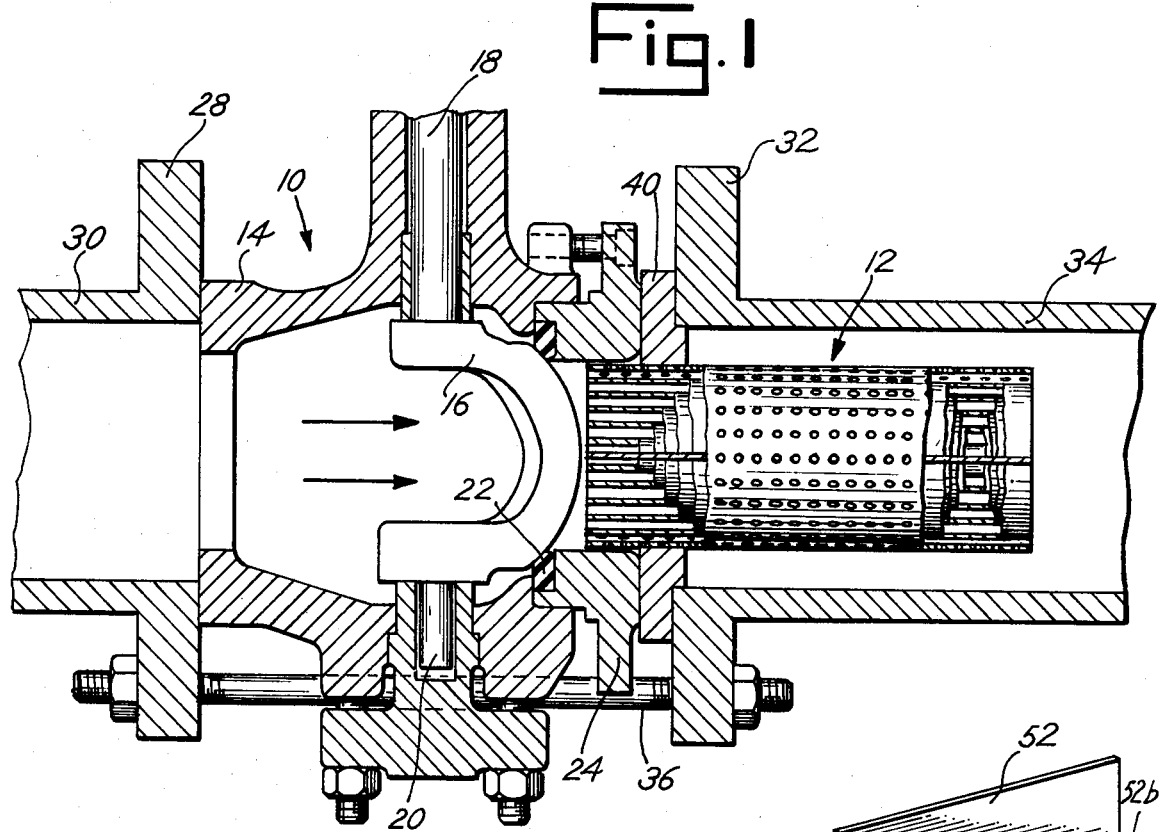
Fig. 1
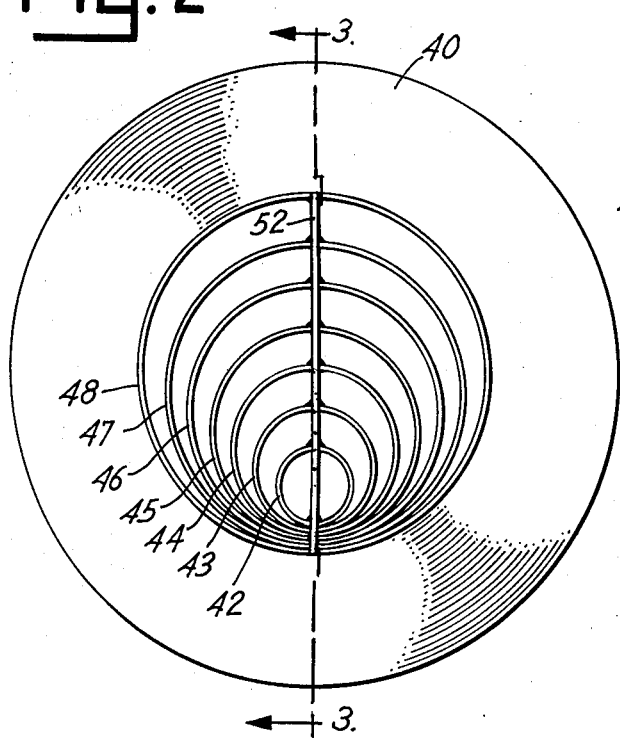
Fig. 2
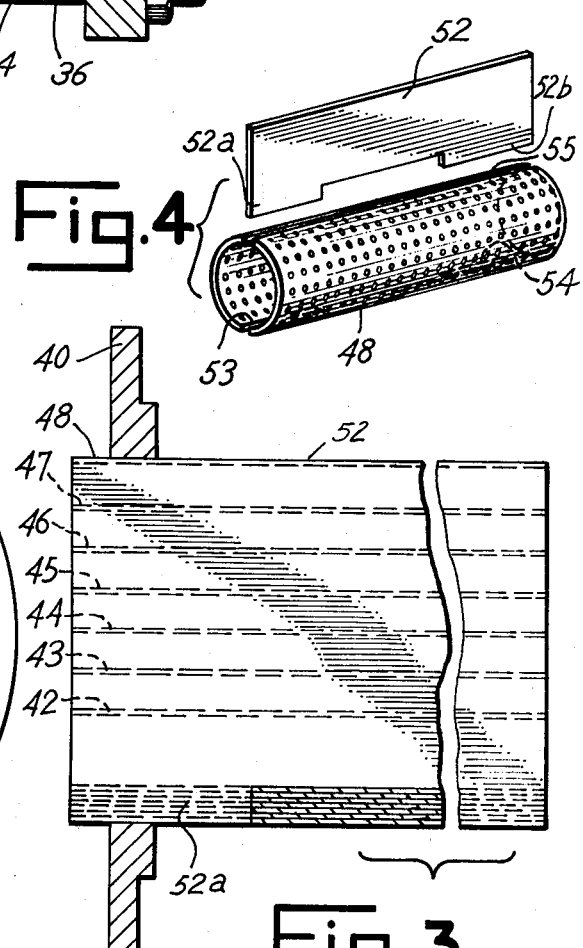
Fig. 4
Fig. 3

ECCENTRICALLY NESTED TUBE GAS LINE SILENCER

BACKGROUND OF THE INVENTION

This invention pertains to the attenuating of the noise of fluid (preferably gas) in non-axisymmetric turbulent flow and, more particularly, to a device for attenuating the noise of gas in a conduit comprising a plurality of nested tubes eccentrically arranged to each other and disposed in substantially parallel relationship to each other along the axis of the conduit. Preferably, the nested tubes are foraminous or perforated along their lengths.

Devices are known which break up a fluid stream into a plurality of parallel flow paths for reducing noise resulting from the flowing fluid. Nagel U.S. Pat. No. 3,630,229 shows a quiet flow fluid regulator comprising a ball valve, a sealing face insert downstream of the ball valve having a plurality of bores therein, and a plurality of parallel flow tubes communicating with the bores in said sealing face insert. The parallel flow tubes comprise a frictional pressure drop means. Vibration absorbing material is packed around the flow tubes to absorb vibrational or acoustic engergy.

Milroy U.S. Pat. No. 3,170,483 reveals a quiet flow regulator valve having a flow silencing tube bundle downstream of a gate valve.

Bauman U.S. Pat. No. 4,085,774 discloses anticavitation and low noise means for a rotary valve having a plug with at least a partially spherical surface. The low noise means comprises a plate having a concave spherical indentation closely engaging the spherical surface of the plug and provided with a plurality of individual flow passages.

Kolb U.S. Pat. No. 4,180,100 pertains to a low noise generation controlvalve having a plurality of small resisting bodies filling the passage in the valve about the cage. A valve plug movable in the cage controls the flow of fluid through the passage. The patent suggests that the small resisting bodies could be made of metallic wool.

Also, it is known to provide fluid resistant devices in ducts to reduce high static-pressure of a liquid or gas without the undesirable by-products of a high aerodynamic noise level in the case of a compressible fluid, such as gas, or cavitation and erosion in case of a liquid. Such fluid resistant devices may comprise spaced apart perforated plates, as in Baumann U.S. Pat. No. 3,665,965, or stacked plates arranged in a selected overlap pattern to provide desired tortuous or serpentine flow paths through the stacked plates, as in Baumann U.S. Pat. No. 4,050,479, or a stack of washer-like members, as in Vick U.S. Pat. No. 4,000,878 or Kluczunski U.S. Pat. No. 4,008,737.

Hasinger U.S. Pat. No. 4,058,141 suggests a supersonic flow diffuser having a plurality of blades therein for dividing the diffuser channel into a plurality of approximately axisymmetric ducts.

Some of these devices for attenuating the noise of gases are complex, cumbersome and costly. Others do not effectively convert non-axisymmetric flow from a valve to desirable axisymmetric flow.

An object of the present invention is to provide a novel device for attenuating noise of fluid in non-axisymmetric turbulent flow that overcomes the disadvantages and deficiencies of prior devices.

Another object of this invention is to provide an improved device for attenuating the noise of gas in non-axisymmetric turbulent flow in a conduit comprising a plurality of nested tubes, which are eccentrically arranged with respect to each other and are disposed in parallel relationship to one another along the longitudinal axis of the conduit.

Yet another object of the present invention is to provide an improved noise attenuating device for gas in non-axisymmetric turbulent flow in a conduit, such device comprising in one form a plurality of foraminous nested tubes arranged in parallel relationship along the longitudinal axis of the conduit, said tubes being eccentrically aligned with respect to each other such that a surface of each tube is substantially in line contact with a surface of each adjacent tube along their longitudinal lengths, the line contact between all of said tubes being at substantially a common line allowing for the thickness of the walls of the tubes.

A further object of the present invention is to provide an improved gas attenuating device for gas in turbulent flow in a conduit, such device comprising in a second form a plurality of foraminous nested tubes arranged in substantially parallel relationship along the longitudinal axis of the conduit, said tubes being eccentrically aligned with respect to each other, and a bracket extending between and connected to each of said tubes to retain the tubes in desired relationship in the conduit.

Still another object of the present invention is to provide an improved device for attenuating the noise of gas in turbulent flow closely downstream of a non-axisymmetric discharging valve and for converting the non-axisymmetric flow to substantially axisymmetric flow, i.e., fully developed pipe flow.

Other objects and advantages of the present invention will be made more apparent in the description which follows.

BRIEF DESCRIPTION OF THE DRAWING

There is shown in the attached drawing presently preferred forms of the present invention wherein like numerals refer to like elements in the various view and wherein:

FIG. 1 is a plan view, partially in section, of a ball-type valve closely associated with a noise attenuating device of the present invention;

FIG. 2 is a front view of one form of a noise attentuating device of this invention;

FIG. 3 is a cross-sectional view of the noise attentuating device taken generally along line 3—3 of FIG. 2;

FIG. 4 is a perspective view illustrating the manner of assembling a support bracket to one of the tubes of the noise attenuating device of FIGS. 1–3;

DETAILED DESCRIPTION OF THE INVENTION

Figure 5:
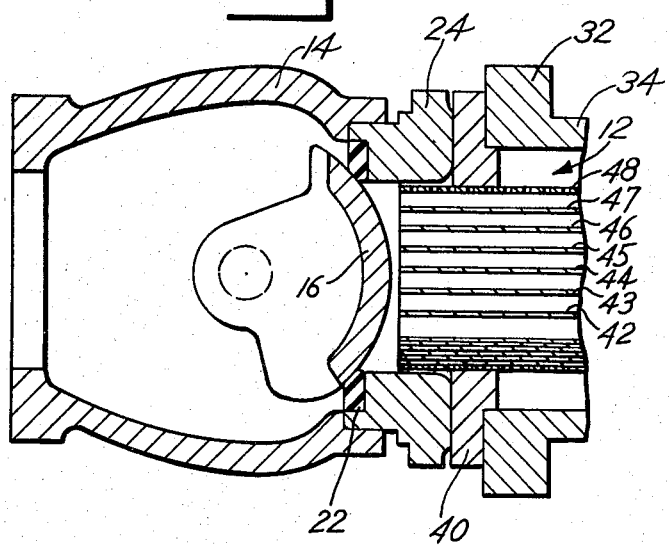
FIG. 5 is a partial side sectional view of a valve plug and a noise attenuating device and illustrating the relationship of the valve plug relative to the noise attentuating device.

There is shown in FIGS. 1-4 one presently preferred form of the noise attentuating device arranged immediately downstream of a non-axisymmetric opening valve plug for rendering the flow substantially axisymmetric and for attenuating the noise of fluid in turbulent flow.

The valve 10 is shown as a ball valve, however, it will be understood that the noise attentuating device of the present invention can be advantageously used with other valves. The ball valve 10 may be similar to that shown in Ainsworth et al U.S. Pat. No. 3,446,477 which is known commercially as the Vee Ball ® valve of Fisher Controls Company, Inc. Since the details of the valve 10 form no part of the present invention, the valve 10 will only be described insofar at it is functionally interrelated with the noise attenuating device 12 of this invention.

The ball valve 10 comprises a valve body 14 having a valve plug 16 with stub shafts 18 and 20 journalled in the body 14. Seal 22, which is preferably made from a resilient elastomeric material, is held in place by the seal ring 24. Seal ring 24 is retained on the valve body 14 by suitable retaining means, for example, capscrews 26. It is to be observed that the seal 22 is downstream of the valve plug 16.

Figure 6:
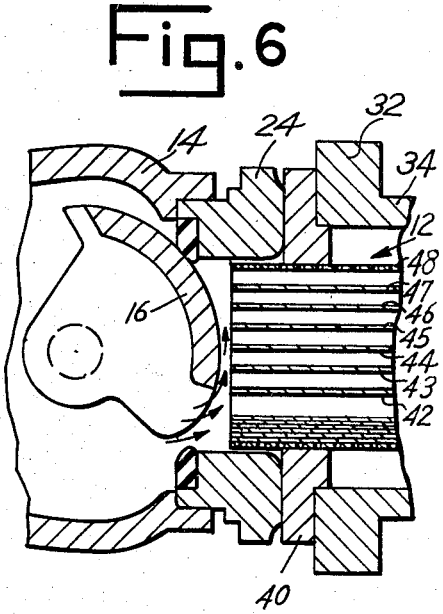
FIG. 6 is a view similar to FIG. 5, but illustrating the valve plug in a partially open position.

Normally, a ball valve is installed in a conduit such that the outer surface of the ball plug faces upstream when it is in the closed position. While the ball valve may be installed in such manner; in the practice of the invention in a preferred embodiment, the ball valve 10 is in a reverse flow configuration, that is the seal 22 against which the ball valve plug 16 seats is downstream from the inlet to valve body 14. When the ball valve plug 16 is closed, as shown in FIG. 5, for example, fluid will abut the inner surface of the ball valve plug. As the ball valve plug 16 opens, flow will commence from the bottom in a non-axisymmetric fashion, as shown in FIG. 6. As the fluid flows through the noise attenuating device, the fluid will gradually tend to fill the passages between the tubes and be converted to fully developed pipe flow (i.e., substantially axisymmetric flow) by the noise attenuating device. It is to be understood that the noise attenuating device can be mounted in a vertical pipe or at an angle, so long as its smallest tube is aligned with the initial opening of the ball valve or the source of non-axisymmetric flow.

Ball valve 10 is positioned between flange 28 on conduit 30 and flange 32 on conduit 34. Bolt means 36 clamp the ball valve 10 between the flanges 28 and 32. The bolt means 36, which are spaced circumferentially about the ball valve 10, also clamp the noise attenuating device 12 in place as will be explained more fully hereafter.

The noise attenuating device 12 of the preferred embodiment of this invention comprises an annular flange 40 secured to the outermost of a plurality of parallel nested tubes. In the embodiment of FIGS. 1-6, there are seven tubes 42-48. The tubes 42-48 are preferably foraminous metallic tubes that are eccentrically mounted within one another. As is apparent from the drawing, the cross-sections of each tube are of different sizes, however, the tubes are of substantially the same cross-sectional shape. As best shown in FIG. 2, the tubes 42-48 are preferably circular. A generally vertically extending brace 52 is provided to help maintain the configuration of the tubes 42-48. The tubes are welded together at the ends and along their length to the brace 52. The tubes 42-48 are spaced closely from one another adjacent their lower most surfaces, as seen for example in FIG. 3.

Figure 9:
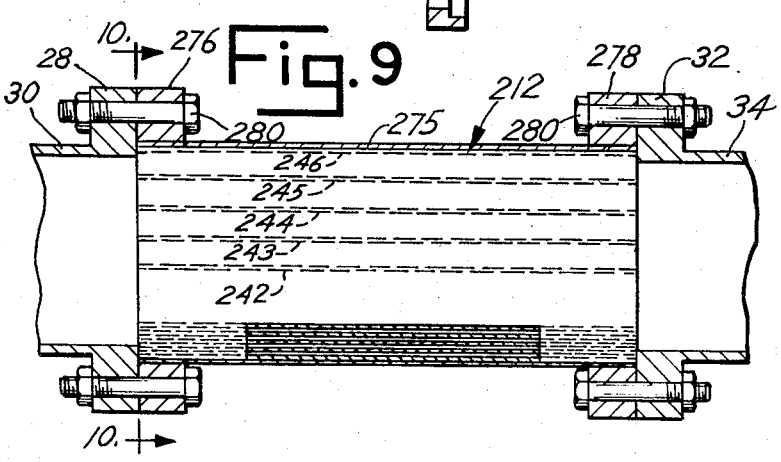
FIG. 9 is an elevation view, partially in section, illustrating a noise attenuating device in a conduit, adjacent a source of non-axisymmetric flow.

With reference to FIG. 4, there is shown the brace 52 and the outer tube 48. It will be understood that each tube is configured in a similar fashion, that is, with the top slit along its length and with the bottom having only partial slits, for example, slits 53, 54 extending inwardly from each end of tube 48. The slits 53, 54 may be in the center of the tubes or inwardly from the ends in some applications to simplify alignment of the various concentric tubes relative to the brace 52 and to facilitate manufacture of the tubes. The tubes 42-48 are assembled is nested relationship. Then brace 52 is slid into the aligned top slits 55, with the tabs 52a and 52b, respectively, in the slits 53 and 54. Each cylinder (starting with the smallest diameter) is assembled to the brace 52 one at a time and welded. The tubes may be connected to the brace 52 either closely spaced at the bottom (for example, 0.25 inch apart as shown in FIG. 9) or in line contact at the bottom, as shown in FIG. 2. The brace 52 rigidifies and strengthens the plurality of foraminous nested tubes. The spacing between tubes at the bottom in the embodiment as shown in FIG. 9, for example, may be increased somewhat for larger diameter noise attenuating devices. The key to successful results is to have as much tube eccentricity as possible consistent with design for mechanical strength to withstand the very high forces involved in many applications.

Figure 7:
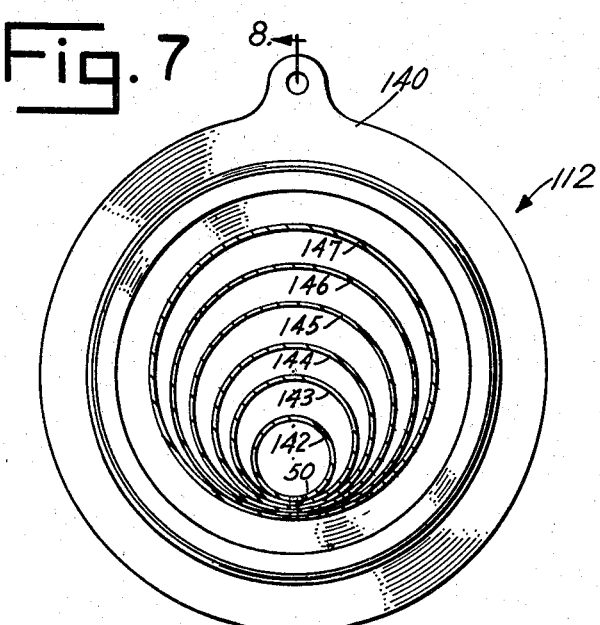
FIG. 7 is a front elevation view of a modified noise attentuating device.
Figure 8:
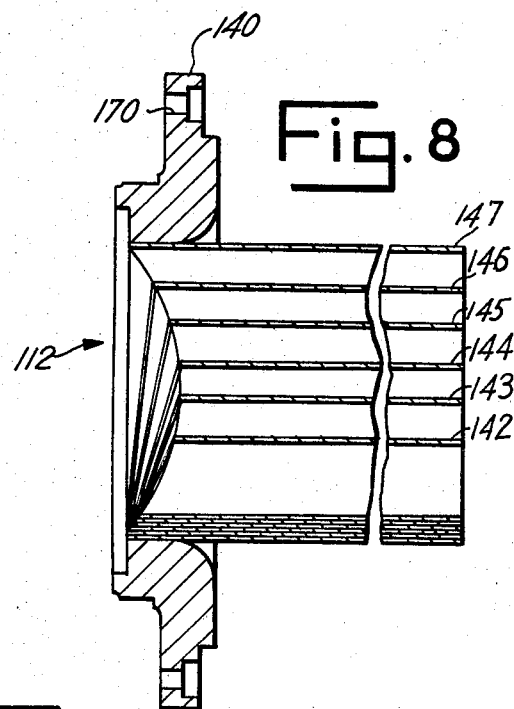
FIG. 8 is a cross-sectional view of the modified noise attenuating device in FIG. 7 taken generally along line 8—8 of FIG. 7 and illustrating the curved front configuration of the tubes which are constructed and arranged to be complementary to the spherical exterior of a valve plug with which the modified noise attentuating device is intended to be used.
Figure 10:
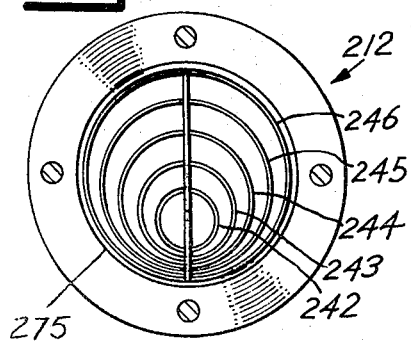
FIG. 10 is cross-section view of the noise attenuating device of FIG. 9 taken generally along the line 10—10.

The longitudinal axis of each tube is generally axially aligned in a plane through the longitudinal axis of the conduit 34. Further, the tubes 42-48 are eccentrically aligned with respect to each other. They can be arranged such that a surface of each tube is in line contact with a surface of each adjacent tube along their longitudinal lengths, as for example, in the embodiments of FIGS. 2 and 3 and FIGS. 7 and 8. The line contact between the tubes in the modifications of FIGS. 7 and 8, is at substantially a common line, allowing for the thickness of the walls of each of the tubes. Alternately, the tubes can be closely spaced at their bottoms as shown in FIGS. 9 and 10.

An optional, but preferred, feature of this invention is the foraminous or perforated walls of each of tubes 42-48. The perforations or holes are preferably about $\frac{1}{8}$ inch in diameter and should be no greater then $\frac{1}{4}$ inch in diameter for silencers where the largest diameter tube is on the order of 18 inches. In tests to date, best results have been obtained with $\frac{1}{8}$ inch diameter holes and where the total open area is about forty percent (40%) of the outer surface area of a tube. For larger silencers on the order of 24 inch outside diameter thicker metal would be used for the tubes and larger holes, on the order of $\frac{3}{8}$ inch or even $\frac{1}{2}$ inch would be needed.

Another feature of this invention is the relationship of the length of tubes 42-48 to the diameter of the inlet to the conduit housing of the noise attenuating device 12. It has been found that the tubes 42-48 should have a characterstic length of at least 1.2 times the characteristic inlet bore dimension of the base containing the source of the non-axisymmetric flow (such as the base of seal ring 24 in FIG. 1). Best results are expected when the tubes 42–48 have a characteristic length of from 1.5 to 4 times the characteristic inlet bore dimension of said conduit. Normally, the seal ring 24 and the conduit 34 have the same cross-sectional configuration and the seal ring 24 has the same or a smaller diameter than the conduit 34.

The orientation of the noise attenuating device 12 relative to the valve plug 10 has been found to be important. For best results, the smallest tube 42 must be positioned in line with the initial opening of the valve so that initial flow from the valve opening will be into the smallest tube.

As the valve plug 16 (FIG. 6) opens to permit non-axisymmetric flow from the valve body 14, the fluid will pass through the bore in seal ring 24 and enters all of the tubes substantially simultaneously near the point where the tubes are substantially in the same line contact, then substantially filing each tube in sequence starting with the smallest tube 42 so that by the time the fluid exits from the noise attentuating device, all of the tubes are substantially filled, with the fluid being in fully developed pipe flow. The noise of the fluid will be attenuated as the fluid spreads radially and passes through other tubes as it flows axially from the inlet to the outlet from the noise attenuating device 12. The smooth transition to axisymmetric flow in the conduit 34 downstream of the valve 10 is at a reduced level of turbulence and hence, noise and system vibration are minimized for both gas and liquid systems. High velocity jets in the conduit 34 downstream of the valve 10 are eliminated. The pressure gradient of the gas in adjacent tubes is reduced. This helps to reduce the turbulence of the fluid and hence, the noise and vibration caused in the downstream conduit 34.

With reference to FIGS. 7 and 8, there is illustrated a modified noise attenuating device 112. The modified noise attentuating device 112 includes a plurality of nested tubes eccentrically aligned with respect to each other, as in the modification of FIGS. 1–6. However, the front of the tubes 142–146 are constructed and arranged to lie along an imaginary spherical surface which is complementary to the exterior spherical surface of a reverse flow ball valve with which the noise attenuating device 112 is to be used. The noise attenuating device 112 has a flange 140 which can be clamped to a ball valve between flanges on adjacent conduit section, as in FIG. 1. Alternately, the flange 140 can be secured to the ball valve 10 by means of bolts passing through holes 170 in the flange 140. The function of the noise attenuating device 112 is essentially the same as that for the noise attentuating device 12.

Turning now to FIGS. 9 and 10, there is shown a noise attenuating device 212 disposed between conduits 30, 34 and arranged immediately downstream from a source of non-axisymmetric flow, for example a sharp turn or a ball valve. The conduits 30, 34 each have a flanged end 28 and 32, respectively. The noise attenuating device 212 includes an imperforate conduit 275 within which are disposed a plurality of eccentrically aligned tubes 242–246, as in the embodiment of FIG. 1–6. The conduit 275 is provided with flanges 276 and 278 at each end which mate with the flanges 28 and 32, respectively. Bolt means 280 or like fasteners are provided to secure the flanges 28, 276 and 32, 278 together. If needed, fluid seals can be provided between the mating faces of flanges 28, 276 and 32, 278, respectively. The noise attenuating device 212 is the same as device 12 in FIGS. 1–6, except that in the embodiment shown there are five nested tubes instead of seven and the tubes are closely spaced adjacent their bottoms rather than in line contact as in FIGS. 1–6. The spacing on the order of one quarter inch in a presently preferred embodiment, can be regarded as minor such that the nested tubes of FIGS. 9 and 10 can be regarded to be substantially in contact.

It will be observed that the number of nested tubes can vary, depending upon application. Whereas, there were seven tubes in the embodiment of FIGS. 2 and 3, for example, there were five tubes in the noise attenuating devices of FIGS. 5 and 6 and FIGS. 9 and 10, and there were six nested tubes in the noise attenuating device of FIGS. 7 and 8.

There has been provided by the present invention an improved noise attenuating device that can be used in a duct or conduit, but preferably is employed downstream from a valve having non-axisymmetric discharge. When used with a valve having a non-axisymmetric discharge, the noise attenuating device provides a smooth transition to axisymmetric flow, reducing turbulence of the fluid and noise emanating therefrom, without imposing significant pressure drop.

While I have shown presently preferred forms of my invention, it is obvious that other modifications will become apparent to those persons skilled in the art, and I desire that the invention be limited only within the scope of the following claims.

What is claimed is:

1. A device for the attenuation of noise of fluid in non-axisymmetric turbulent flow comprising a conduit having inlet and outlet ends longitudinally disposed one from the other and disposed within said conduit a plurality of nested tubes of varying cross-sectional size but of substantially the same cross-sectional shape, each of said tubes having a longitudinal axis and each of said tubes being open at both ends for providing a longitudinal flow path through each tube and through the ends thereof, the longitudinal axis of each of said tubes being axially aligned in a plane through the longitudinal axis of said conduit, said tubes being eccentrically aligned with respect to each other such that a surface of each tube is in closely spaced relationship with a surface of each adjacent tube along their longitudinal lengths, and means for connecting the tubes, with the smallest nested tube being in axial alignment with the source of non-axisymmetric turbulent flow, whereby fluid enters all of the tubes substantially simultaneously and then substantially fills each tube in sequence, such that when the fluid exits from the device, all of the tubes are substantially filled.

2. A device as in claim 1 wherein said tubes have a characeristic length of at least 1.2 times the characteristic inlet bore dimension.

3. A device as in claim 2 wherein said tubes have a characteristic length of from 1.5 to 4 times the characteristic inlet bore dimension.

4. A device as in any of claims 1, 2 or 3 wherein said conduit and said tubes are circular in cross-section.

5. A device as in any of claims 1, 2 or 3 wherein said tubes have foraminous walls.

6. A device as in any of claims 1, 2 or 3 wherein said tubes have perforated walls, said perforation being holes of up to about 0.25 inch diameter.

7. A device as in claim 3 wherein said conduit and tubes are circular in cross-section, and said tubes have foraminous walls and have a characteristic length of from 1.5 to 4 times the characteristic inlet bore dimension.

8. A device as in claim 1 further comprising a valve disposed proximate the inlet of said conduit, said valve and said plurality of tubes being disposed with respect to each other such that as the valve is opened to permit flow, said flow filling each tube in sequence starting with the smallest tube, whereby when the fluid exits from said device, all of the tubes are substantially filled with fluid, and the fluid is in substantially fully developed pipe flow.

9. A device as in claim 8 wherein said tubes have a characteristic length of at least 1.2 times the characteristic inlet bore dimension.

10. A device as in claim 9 wherein said tubes have a characteristic length of from 1.5 to 4 times the characteristic inlet bore dimension.

11. A device as in any of claims 8, 9 or 10 wherein said conduit and said tubes are circular in cross-section.

12. A device as in any of claims 8, 9 or 10 wherein said tubes have foraminous walls.

13. A device as in any of claims 8, 9 or 10 wherein said tubes have perforated walls, said perforations being holes of up to about 0.25 inch diameter.

14. A device as in claim 10 wherein said conduit and tubes are circular in cross-section, and said tubes have foraminous walls and have a characteristic length of from 1.5 to 4 times the characteristic inlet bore diameter.

15. A device as in claim 8 wherein said valve is a ball valve.

16. A device as in claim 15 wherein said ball valve is a reverse flow ball valve.

17. A device as in claim 16 wherein said tubes have a characteristic length of at least 1.2 times the characeristic inlet bore dimension.

18. A device as in claim 17 wherein said tubes have a characteristic length of from 1.5 to 4 times the characteristic inlet bore dimension.

19. A device as in any of claims 16, 17 or 18 wherein said conduit and said tubes are circular in cross-section.

20. A device as in any of claims 16, 17 or 18 wherein said tubes have foraminous walls.

21. A device as in any of claims 16, 17 or 18 wherein said tubes have perforated walls, said perforations being up to about 0.25 inch diameter.

22. A device as in claim 18 wherein said conduit and tubes are circular in cross-section, and said tubes have foraminous walls and have a characteristic length of from 1.5 to 4 times the characteristic inlet bore diameter.

23. A device as in claim 1 wherein the tubes abut one another in substantially line contact.

24. A device as in claim 23 wherein contact between all of said tubes is at substantially a common line allowing for the thickness of the tube walls.

25. A device for attenuation of noise of fluid in non-axisymmetric turbulent flow comprising a conduit having inlet and outlet ends and disposed within said conduit a plurality of nested tubes of varying cross-sectional size but of substantially the same cross-sectional shape, each of said tubes having a longitudinal axis, the longitudinal axis of each of said tubes being axially aligned in a plane through the longitudinal axis of said conduit, said tubes being eccentrically aligned with respect to each other such that a lower surface of each tube is in closely spaced relationship with a surface of each adjacent tube along their longitudinal lengths, each tube being slotted at the top and at the bottom, the top slot extending the length of the tube, and a brace extending through the top slots and connected to the tubes.

* * * * *

UNITED STATES PATENT AND TRADEMARK OFFICE
CERTIFICATE OF CORRECTION

PATENT NO. : 4,402,485
DATED : September 6, 1983
INVENTOR(S) : Allen C. Fagerlund It is certified that error appears in the above-identified patent and that said Letters Patent is hereby corrected as shown below:

Column 1, line 38, "controlvalve" should read -- control vale --.

Column 1, line 38, "pluraity" should read -- plurality --.

Column 4, line 20, "is", first occurrence, should read -- in --.

Column 5, line 18, "filing" should read -- filling --.

Signed and Sealed this

Fourteenth Day of February 1984

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,402,485

DATED : September 6, 1983

INVENTOR(S) : Allen C. Fagerlund

It is certified that error appears in the above-identified patent and that said Letters Patent is hereby corrected as shown below:

Column 1, line 38, "controlvalve" should read -- control valve --.
Column 1, line 38, "pluraity" should read -- plurality --.
Column 4, line 20, "is", first occurrence, should read -- in --.
Column 5, line 18, "filing" should read -- filling --.

This certificate supersedes Certificate of Correction issued February 14, 1984.

Signed and Sealed this

Seventeenth Day of July 1984

[SEAL]

Attest:

GERALD J. MOSSINGHOFF

Attesting Officer

Commissioner of Patents and Trademarks